(12) United States Patent
Wu

(10) Patent No.: US 7,095,471 B2
(45) Date of Patent: Aug. 22, 2006

(54) IN-PLANE SWITCHING LCD DEVICE COMPRISING COMMON ELECTRODE OFFSHOOTS ARRANGED AT TWO DIFFERENT PLANES ON THE LOWER SUBSTRATE WITH THE ELECTRODE OFFSHOOTS ON HIGHER PLANE OVERLAPPING THE ONES ON LOWER PLANE, AND HAVING SAME SHAPES

(75) Inventor: Yang-En Wu, Taipei (TW)

(73) Assignee: AU Optronics Corp., Hsin-Chu (TW)

( * ) Notice: Subject to any disclaimer, the term of this patent is extended or adjusted under 35 U.S.C. 154(b) by 13 days.

(21) Appl. No.: 10/708,354

(22) Filed: Feb. 26, 2004

(65) Prior Publication Data

US 2004/0207792 A1    Oct. 21, 2004

(30) Foreign Application Priority Data

Apr. 17, 2003   (TW) .............................. 92108995 A

(51) Int. Cl.
*G02F 1/1343*   (2006.01)

(52) U.S. Cl. .................. 349/141; 349/147; 349/148

(58) Field of Classification Search ................ 349/141, 349/147, 148
See application file for complete search history.

(56) References Cited

U.S. PATENT DOCUMENTS

| 2001/0050745 A1* | 12/2001 | Liu et al. ................... 349/141 |
| 2002/0154262 A1* | 10/2002 | Yamakita et al. ........... 349/141 |
| 2003/0043327 A1* | 3/2003 | Aoyama et al. ............ 349/141 |
| 2004/0109120 A1* | 6/2004 | Lee et al. .................. 349/141 |

* cited by examiner

*Primary Examiner*—Andrew Schechter
*Assistant Examiner*—(Nancy)Thanh-Nhan P Nguyen
(74) *Attorney, Agent, or Firm*—Winston Hsu

(57) ABSTRACT

An in-plane switching mode liquid crystal display (IPS-LCD) with a higher opening ratio. The IPS-LCD includes a lower substrate, a plurality of scan lines and a plurality of data lines positioned on the lower substrate, a plurality of pixel electrodes containing pixel electrode offshoots, an insulation layer covering the scan lines and pixel electrodes, a plurality of common electrodes covering one of the pixel electrode offshoots, an upper substrate, and a plurality of liquid crystal molecules filled between the two substrates. An overlapping portion of each pixel electrode offshoot and each common electrode serves as a storage capacitor.

33 Claims, 8 Drawing Sheets

IN-PLANE SWITCHING LCD DEVICE COMPRISING COMMON ELECTRODE OFFSHOOTS ARRANGED AT TWO DIFFERENT PLANES ON THE LOWER SUBSTRATE WITH THE ELECTRODE OFFSHOOTS ON HIGHER PLANE OVERLAPPING THE ONES ON LOWER PLANE, AND HAVING SAME SHAPES

BACKGROUND OF INVENTION

1. Field of the Invention

The invention relates to an in-plane switching mode liquid crystal display (IPS-LCD), and more particularly, to an IPS-LCD with a higher opening ratio.

2. Description of the Prior Art

Since the LCD has the advantages of portability, low power consumption, and low radiation, the LCD has been widely used in various portable information products, such as notebooks, personal digital assistants (PDA), video cameras, and etc. Furthermore, the LCD even has a potential to replace the CRT monitor or the television gradually.

The operation theory of an LCD is to control the light amount passing through the liquid crystal layer by various arrangements of liquid crystal molecules and control the polarization and refraction of light beams to perform colorful images. There is a serious limitation in application for a conventional twist nematic (TN) LCD and a conventional super-twisted nematic (STN) for they have very narrow view angles because they are both affected by the structures and optic characteristics of liquid crystal molecules. Therefore the manufacturers are devoted to develop LCDs with new structures that can provide wider view angles. Currently an IPS-LCD is developed to solve the problem of narrow view angle of a conventional IN-LCD.

FIG. 1 is a section view of an IPS-LCD 10 according to the prior art. FIG. 2 is a top view of a lower substrate 14 of the IPS-LCD 10 shown in FIG. 1. Referring to FIG. 1 and FIG. 2, the IPS-LCD 10 comprises an upper substrate 12, a lower substrate 14 formed in parallel with and opposite to the upper substrate 12, a plurality of scan lines 16 and a plurality of data lines 18 arranged perpendicular to the scan lines 16 to form a pixel matrix, a plurality of first electrodes 20 and a plurality of second electrodes 22 on the lower substrate 14, an insulation layer 24 formed between the first electrodes 20 and the second electrodes 22 for insulating the first electrodes 20 and the second electrodes 22, a first polarizer 26a on the bottom surface of the lower substrate 14, a second polarizer 26b on the upper surface of the upper substrate 12, a first alignment film 28a on the upper surface of the lower substrate 14, a second alignment film 28b on the bottom surface of the upper substrate 12, and a plurality of liquid crystal molecules 30 filled between the upper substrate 12 and the lower substrate 14. Any two adjoining scan lines 16 and any two adjoining data lines 18 are crossed to define a pixel.

The first electrodes 20 are common electrodes, and the second electrodes 22 are pixel electrodes. The first electrodes 20 contain a plurality of first electrode offshoots 20a, 20b, and 20c with equal distances and being parallel with the data lines 18. The first electrodes 20 are electrically connected to a common signal. The second electrodes 22 contain a plurality of second electrode offshoots 22a and 22b with equal distances. The second electrode offshoots 22a and 22b are parallel with the first electrode offshoots 20a, 20b, and 20c. As shown in FIG. 2, the second electrode offshoot 22a is electrically connected to a thin film transistor (TFT) set on the crossover region of the data line 18 and the scan lines 16 for controlling the switching state of the pixel of the LCD 10.

Although the IPS-LCD can improve the performance of view angle of conventional TN-LCDs, another problem still exists in an IPS-LCD: a viewer in different view angles may see different color tones, especially when in a wider view angle. This is because a liquid crystal molecule has an elongated shape with an elongated major axis and a minor axis, so that it has a property of anisotropic refraction. This results in the viewer not seeing exactly the same color tones in different positions or directions. Therefore a Super In-plane Switching mode LCD (Super-IPS LCD) is developed.

FIG. 3 is a top view of a lower substrate 52 of a Super-IPS LCD 50 according to the prior art. Referring to FIG. 3, the lower substrate 52 of the Super-IPS LCD 50 according to the prior art contains a plurality of parallel scan lines 54 and a plurality of data lines 56 with equal distances. The scan lines 54 and the data lines 56 are arranged in a crossing manner to form a pixel matrix. Any two of the adjoining scan lines 54 and any two of the adjoining data lines 56 are crossed to define a pixel 58. In addition, at least one switching device 60, such as a TFT, is set in each of the crossover region of the scan lines 54 and the data lines 56. A common electrode 62 containing a plurality of parallel common electrode offshoots 62a, 62b, 62c, and a pixel electrode 64 containing a plurality of pixel electrode offshoots 64a, 64b parallel with the common electrode offshoots 62a, 62b, 62c are disposed on the lower substrate 52 of each of the pixel 58.

In contrast to the conventional IPS-LCD 10, the data lines 56, the common electrode offshoots 62a, 62b, 62c, and the pixel electrode offshoots 64a, 64b of the Super-IPS LCD 50 are shown as bended lines or curved lines. Therefore the common electrode offshoots 62a, 62b, 62c, and the pixel electrode offshoots 64a, 64b with different directions in a pixel 58 produce electric fields with different directions, which make the liquid crystal molecules in the pixel 58 deflect to different directions to solve the problem of un-balanced color tones of the conventional IPS-LCD 10.

In both of the IPS-LCD and the Super-IPS LCD according to the prior art, the pixel electrodes, the scan lines below the pixel electrodes, and the insulation layer between the pixel electrodes and the scan lines (such as the insulation layer 24 in FIG. 1) serve together as storage capacitors for storing the electricity to make the liquid crystal molecules deflect. Taking the Super-IPS LCD 50 as an example, the pixel electrode 64, the scan line 54, and the insulation layer set between the pixel electrode 64 and the scan line 54 serve together as a storage capacitor of the pixel 58. As a result, the pixel electrode in each of the pixels of a conventional LCD has to be designed in particular to cover an adjacent scan line to form a storage capacitor. In order to store sufficient electricity to supply the LCD showing an image, the overlapping portion of the pixel electrode and the scan line must occupy a certain extent area. Thus a pixel electrode should occupy a large area of the pixel, and each of the scan lines also should be wide to satisfy the condition of being a storage capacitor of the pixel. Besides, both of the pixel electrodes and the scan lines are formed by non-transparent metal materials, therefore light beams cannot not pass through the wide pixel electrodes and scan lines, which means the LCD is limited to lower opening ratio. In the modern technology, it is difficult to fabricate an LCD with a low opening ratio to become lighter and thinner. An LCD with a low opening ratio also need higher fabricating cost, which makes the manufacturer less competitive in the LCD market.

As a result, to fabricate an LCD with a high opening ratio without difficult fabricating processes to raise the competitive superiority is an important issue.

SUMMARY OF INVENTION

It is therefore a primary objective of the claimed invention to provide an IPS-LCD with a high opening ratio to solve the above-mentioned problem.

According to the claimed invention, the IPS-LCD with a higher opening ratio comprises a lower substrate, a plurality of parallel scan lines positioned on the upper surface of the lower substrate, a plurality of data lines with equal distances arranged perpendicular to the scan lines to form a pixel matrix with that any two of the adjoining scan lines and any two of the adjoining data lines crossed to define a pixel, a plurality of the first electrodes containing a plurality of parallel first electrode offshoots formed in each of the pixels, an insulation layer on the first electrode and the scan lines, a plurality of the second electrodes covering at least one of the first electrode offshoots in each of the pixels, an upper substrate formed in parallel with and opposite to the lower substrate, and a plurality of liquid crystal molecules filled between the lower substrate and the upper substrate. The scan lines and the data lines are arranged in a crossing manner to form a pixel matrix, and any two of the adjoining scan lines and any two of the adjoining data lines are crossed to define a pixel. The overlapping portion of each of the second electrodes and each of the first electrode offshoots serve as a storage capacitor of each of the pixels. In view of the function of the first electrode and the second electrode in a pixel, the first electrode is a common electrode and the second electrode is a pixel electrode.

It is an advantage of the claimed invention that the IPS-LCD uses the overlapping portions of the pixel electrodes and the common electrodes as storage capacitors so that the width of each of the scan lines can be reduced because the pixel electrodes are no longer needed to cover the scan lines for being storage capacitors. Furthermore, each of the pixel electrodes and the common electrodes covered by the pixel electrodes are both existing devices in the IPS-LCD, thus the claimed invention has a highly raised opening ratio. In the preferred embodiment of the claimed invention, when using the overlapping portion of the pixel electrodes and the common electrodes and the insulation layer as storage capacitors, its opening ratio can be raised about 5%, which means the opening ratio may reach 36%. Meanwhile, the opening ratio of a conventional IPS-LCD is only 31%.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
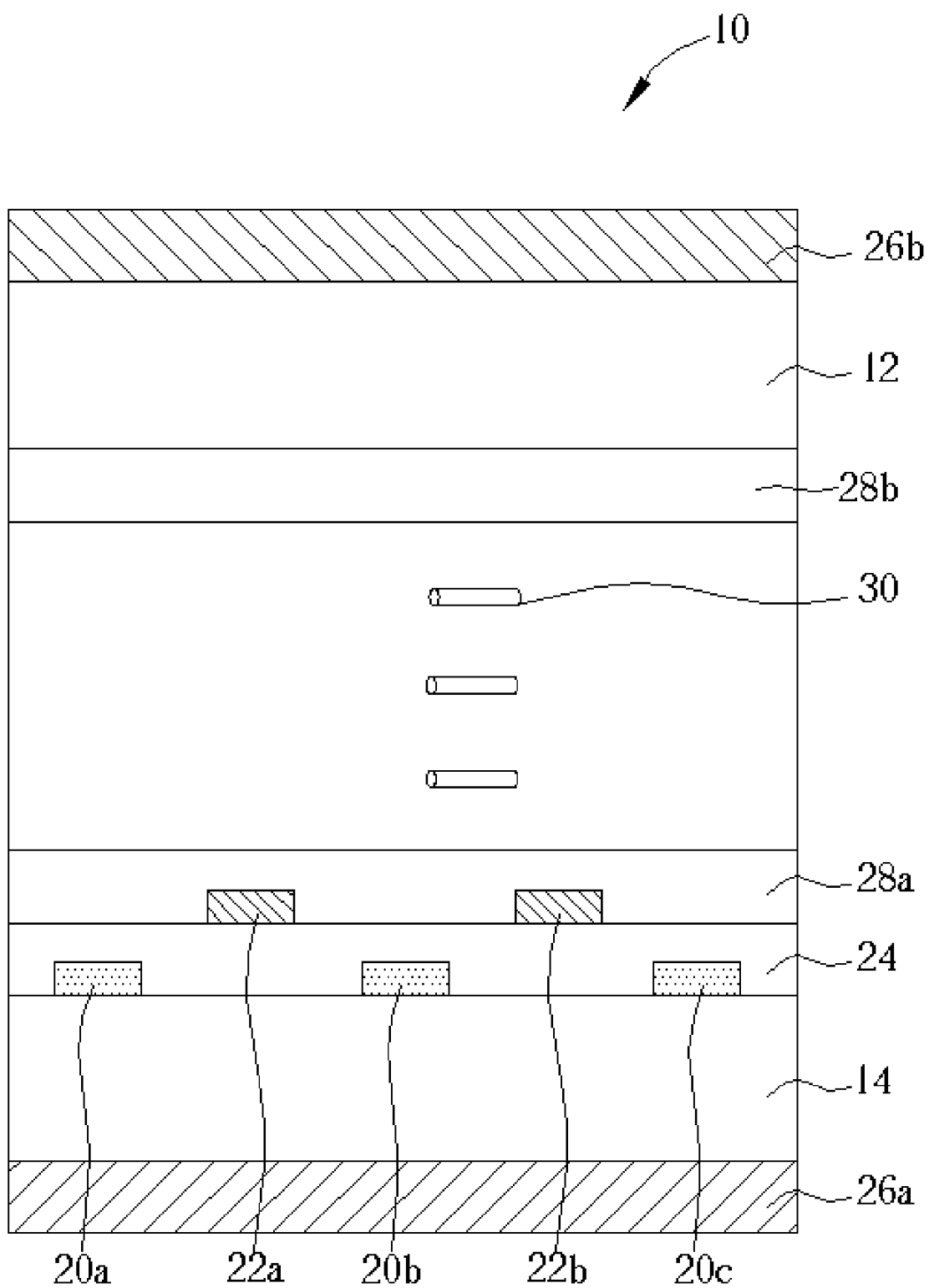
FIG. 1 is a section view of an IPS-LCD according to the prior art.
Figure 2:
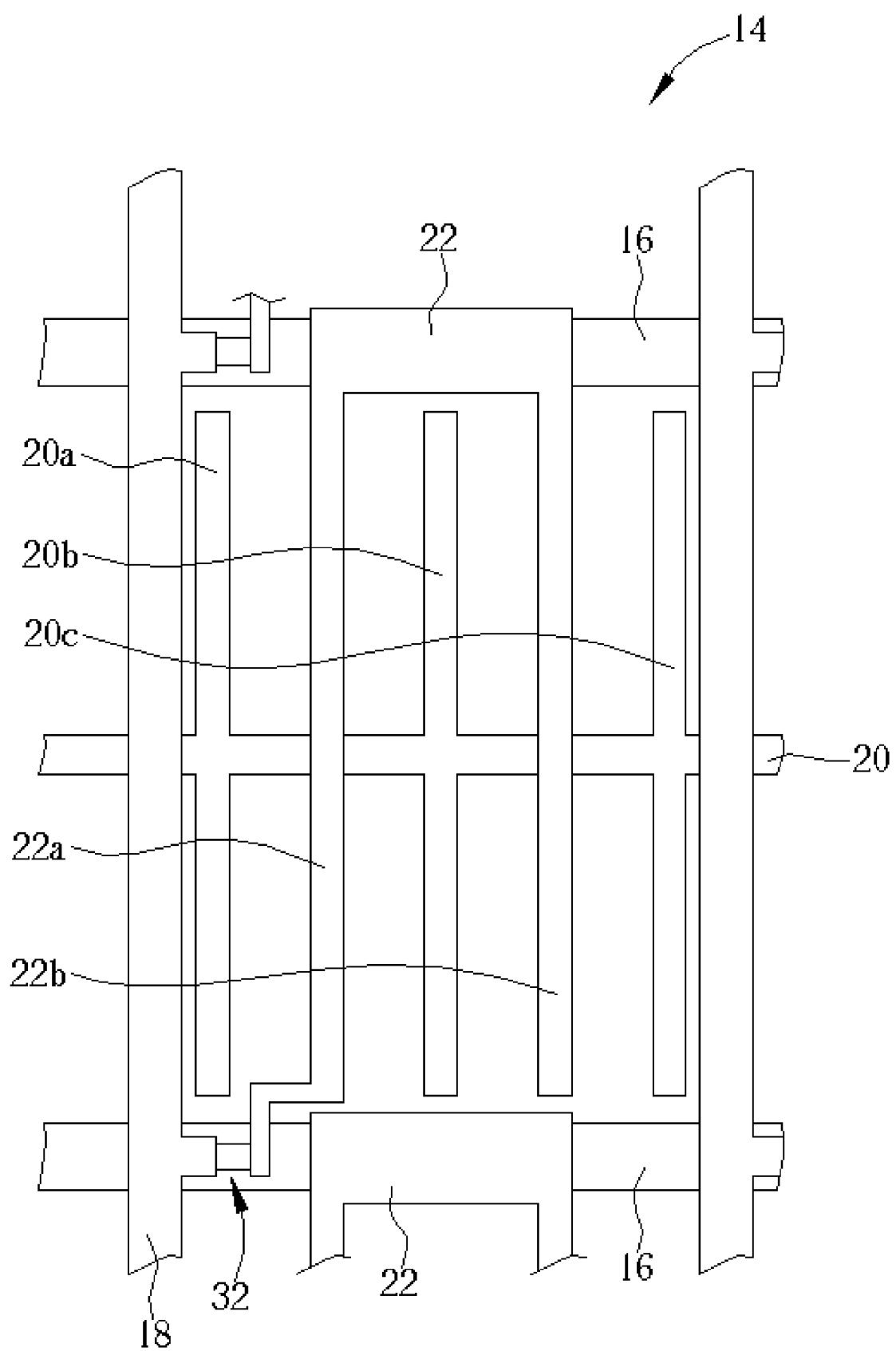
FIG. 2 is a top view of a lower substrate of the IPS-LCD shown in FIG. 1.
Figure 3:
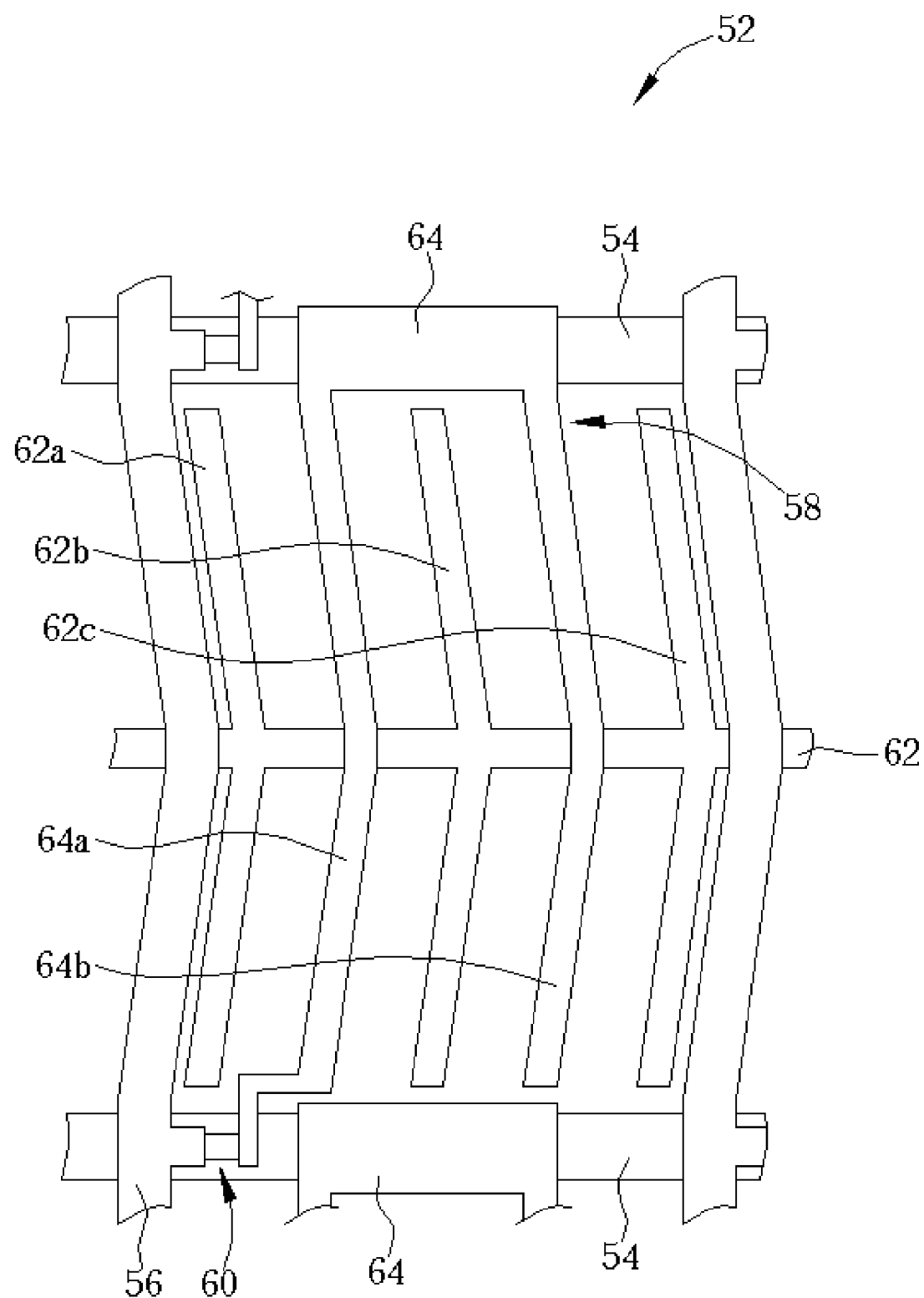
FIG. 3 is a top view of a lower substrate of a Super-IPS LCD according to the prior art.
Figure 4:
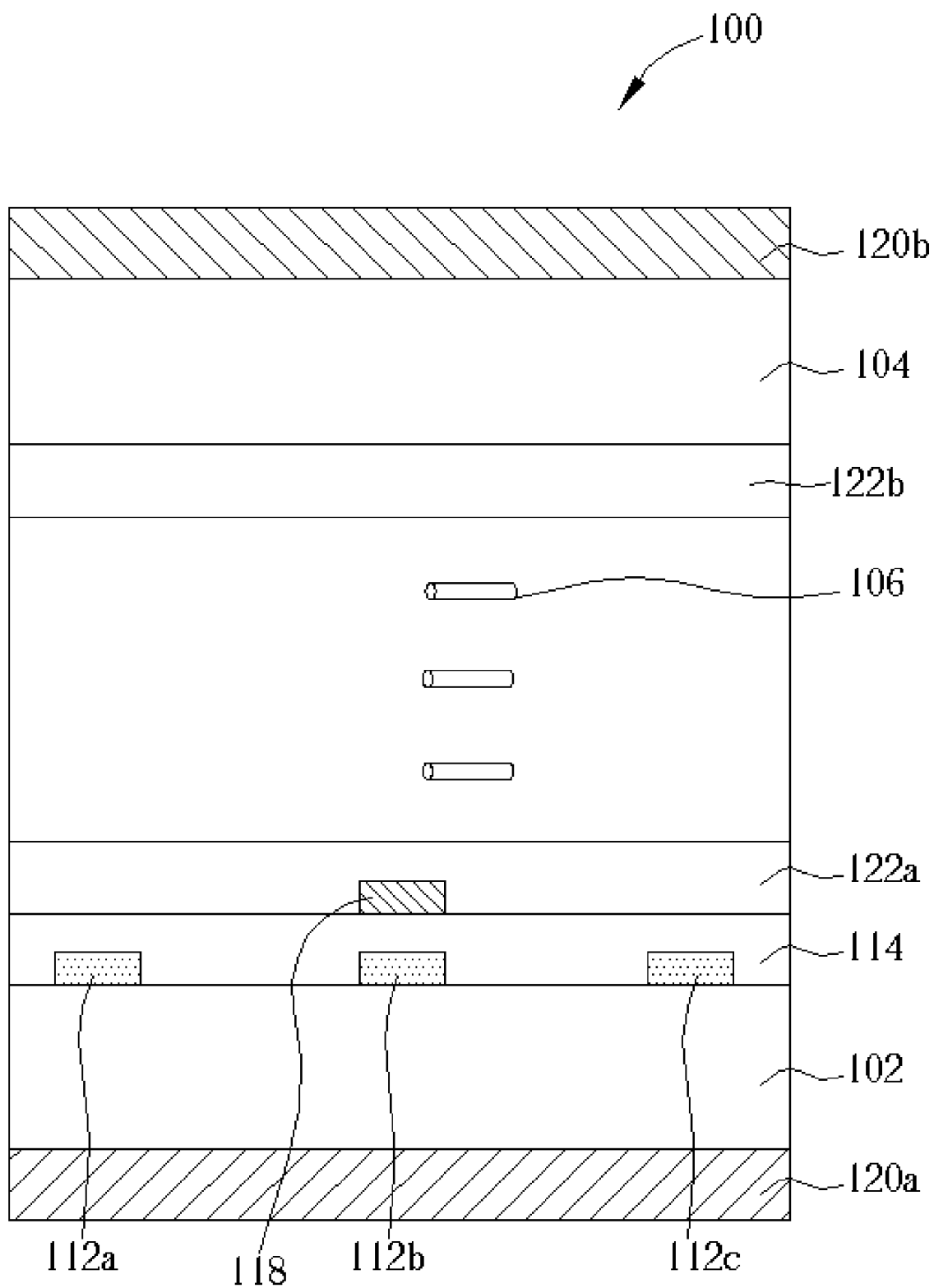
FIG. 4 is a section view of an IPS-LCD according to a first embodiment of the present invention.
Figure 5:
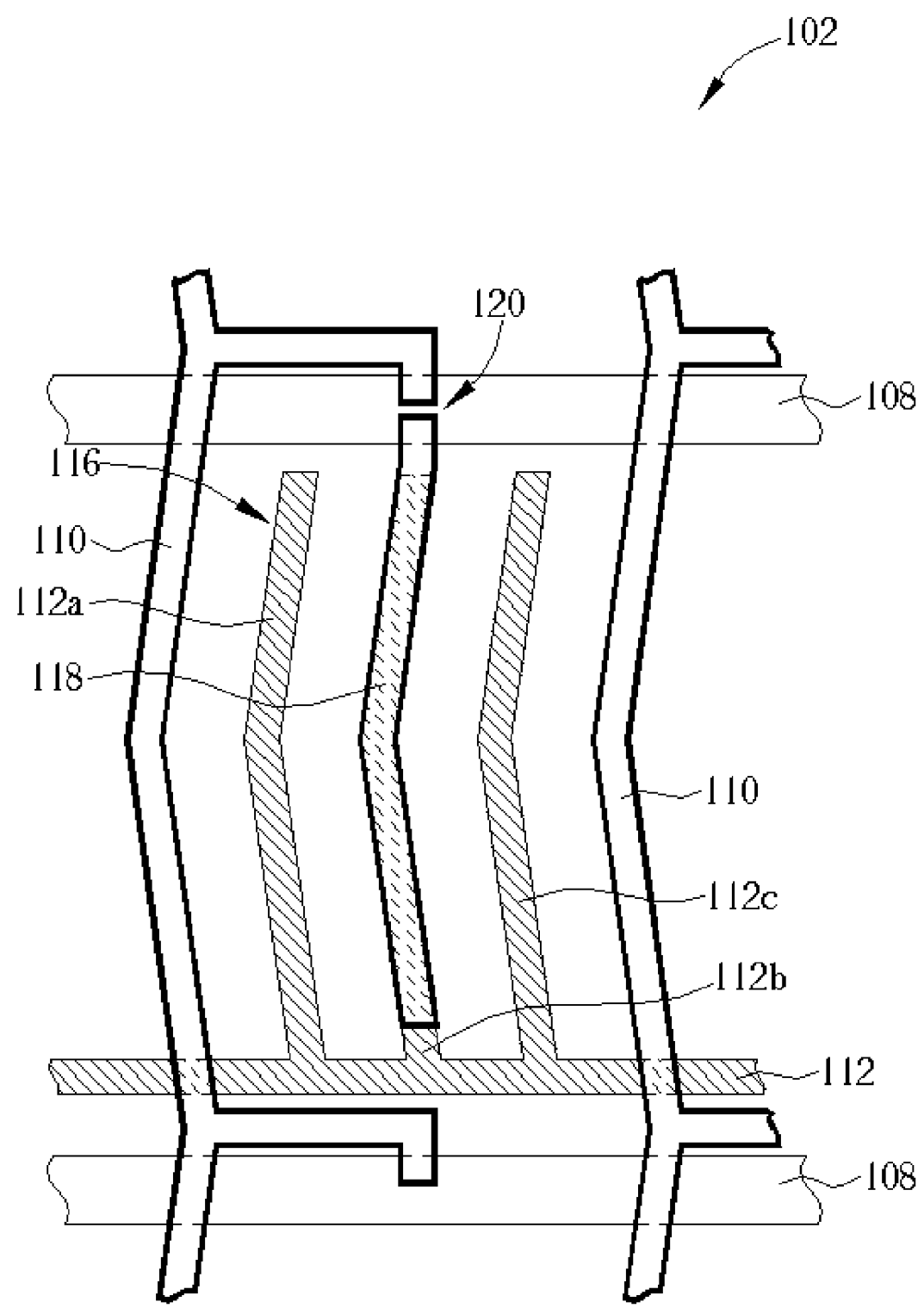
FIG. 5 is a top view of a lower substrate of the IPS-LCD shown in FIG. 4.

Referring to FIG. 4 and FIG. 5, FIG. 4 is a section view of an IPS-LCD 100 according to a first embodiment of the present invention, and FIG. 5 is a top view of a lower substrate 102 of the IPS-LCD 100 shown in FIG. 4. The present invention IPS-LCD 100 comprises a lower substrate 102, an upper substrate 104, and a plurality of liquid crystal molecules 106 filled between the lower substrate 102 and the upper substrate 104.

The lower substrate 102 has a plurality of parallel scan lines 108 and a plurality of data lines 110 shown as beaded lines with equal distances thereon. The scan lines 108 and the data lines 110 are arranged in a crossing manner to form a pixel matrix. Any two of the adjoining scan lines 108 and any two of the adjoining data lines 110 are crossed to define a pixel 116. In the crossover region of each of the scan lines 108 and the data lines 110 contains at least one electric device, such as a TFT 120, as a switching device of the pixel 116. The lower substrate 102 further contains, on the upper surface of the lower substrate 102, a plurality of the first electrodes 112 in each of the pixels 116, an insulation layer 114 positioned on the first electrodes 112 and the scan lines 108, and a plurality of the second electrodes 118 parallel with the data lines 110 in each of pixels 116. Each of the first electrodes 112 contains a plurality of first electrode offshoots 112a, 112b, 112c with equal distances parallel with the data lines 110, and the second electrode 118 covers the first electrode offshoot 112b (as shown in FIG. 5).

In this embodiment, the first electrodes 112 and the second electrodes 118 are used as the common electrodes and the pixel electrodes of the IPS-LCD 100 respectively, and the overlapping portions of the second electrodes 118 and the first electrode offshoots 112b serve as storage capacitors of the pixels 116. The first electrodes 112 and the second electrodes 118 are disposed in a single-layer structure or a multi-layer structure comprising titanium (Ti), aluminum (Al), aluminum based alloy, indium tin oxide (ITO), or other conductive materials. Furthermore, as shown in FIG. 4 the IPS-LCD 100 of the present invention further comprises a first polarizer 120a on the bottom surface of the lower substrate 102, a second polarizer 120b on the upper surface of the upper substrate 104, a first alignment film 122a on the upper surface of the lower substrate 102, and a second alignment film 112b on the bottom surface of the upper substrate 104.

According to the present invention, a first electrode offshoot 112b is set under the original existing second electrode 118, i.e. pixel electrode, so that the overlapping portion of the first electrode offshoot 112b, the existing second electrode 118, and the insulation layer 114 are used together as a storage capacitor in each of the pixels 116 and no non-transparent area will be increased. Furthermore, it is no longer needed to make the second electrode 118 cover the scan lines 108 as a storage capacitor, so that the width of the scan lines 108 can be reduced. Therefore the opening ratio of each pixel 116 can be raised, and the density of the pixel matrix of the IPS-LCD 100 can be raised in contrast to a conventional IPS-LCD with an equal size.

Figure 6:
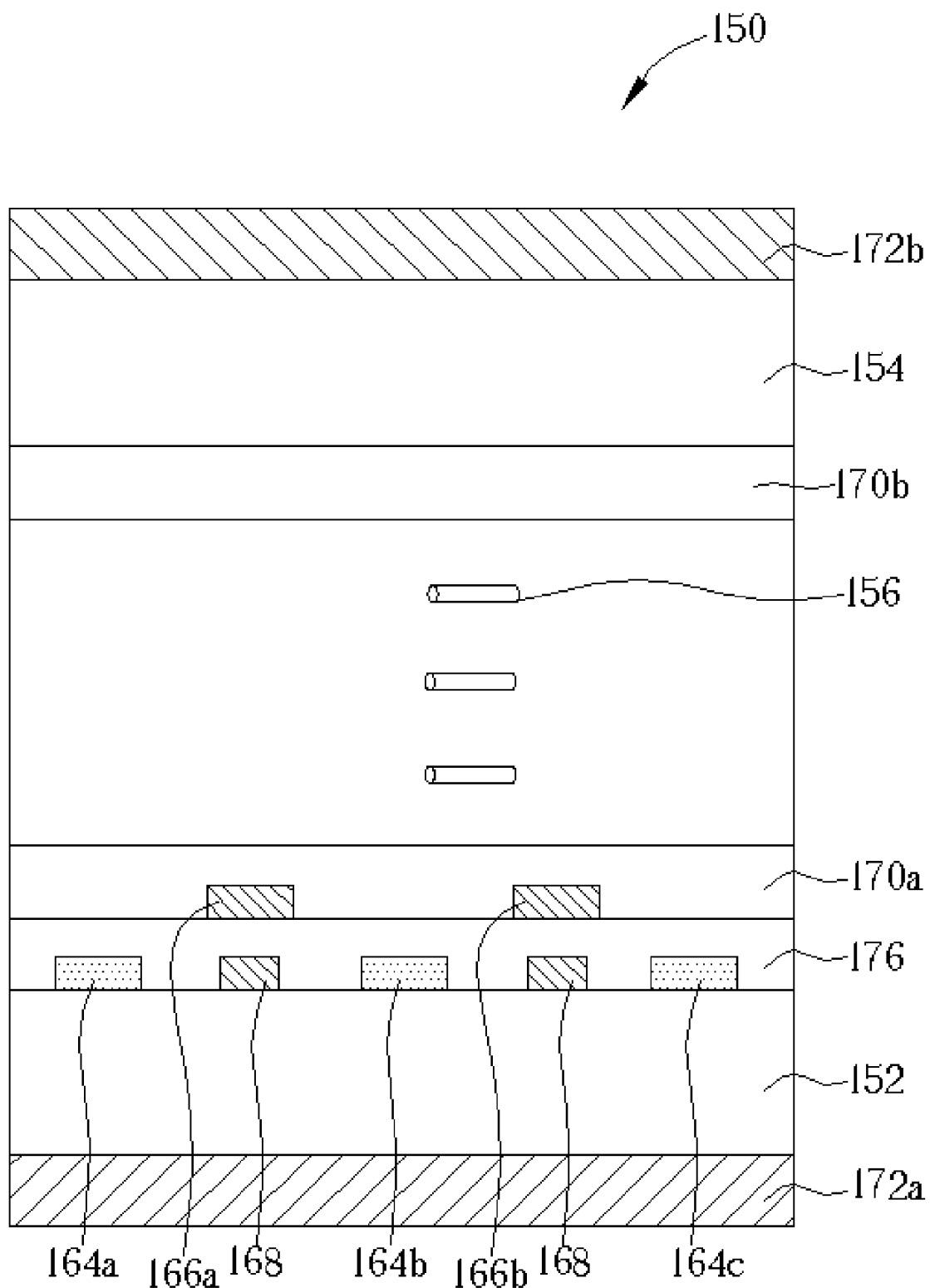
FIG. 6 is a section view of an IPS-LCD according to a second embodiment of the present invention.
Figure 7:
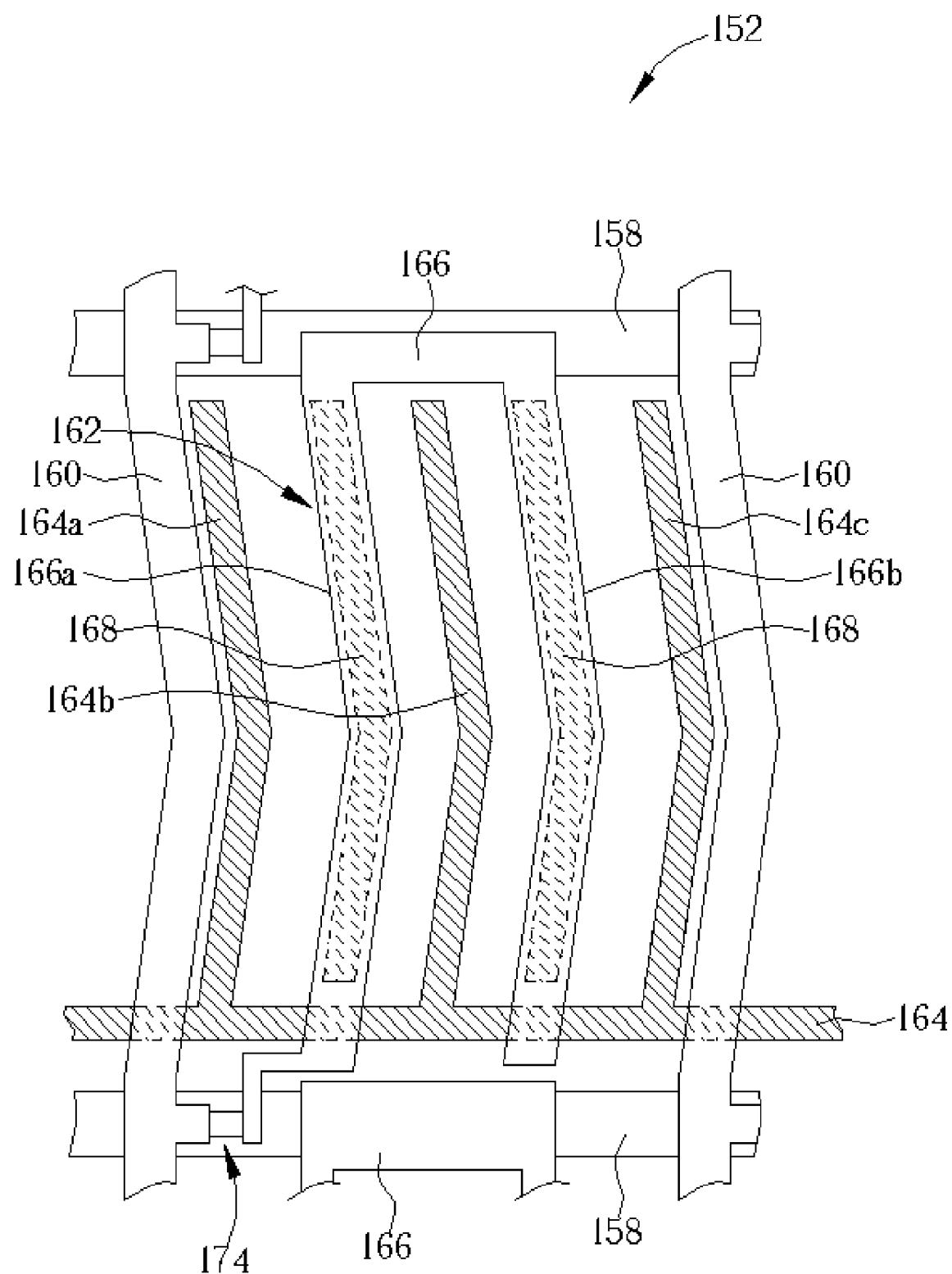
FIG. 7 is a top view of a lower substrate of the IPS-LCD shown in FIG. 6.

Referring to FIG. 6 and FIG. 7, FIG. 6 is a section view of an IPS-LCD 150 according to a second embodiment of the present invention, and FIG. 7 is a top view of a lower substrate 152 of the IPS-LCD 150 shown in FIG. 6. The IPS-LCD 150 comprises a lower substrate 152, an upper substrate 154, and a plurality of liquid crystal molecules 156 filled between the both substrate. The lower substrate 152 has a plurality of parallel scan lines 158 and a plurality of data lines 160 with equal distances thereon, wherein the scan lines 158 and the data lines 160 are arranged in a crossing manner to form a plurality of pixels 162. Each pixel 162 contains a common electrode 164, a pixel electrode 166, and a TFT 174.

In this embodiment, each of the common electrodes 164 in a pixel 162 contains three common electrode offshoots 164a, 164b, 164c, and each of the pixel electrodes 166 contains two pixel electrode offshoots 166a, 166b. The common electrode offshoots 162a, 162b, 162c and the pixel electrode offshoots 166a, 166b are parallel with each other in the pixel 162. Each of the pixels 162 further contains a plurality of capacitor electrodes 168 (FIG. 7 shows two capacitor electrodes) which are parallel with each other and under the pixel electrode offshoots 166a, 166b. As shown in FIG. 6, the pixel electrode offshoots 166a, 166b is positioned above the capacitor electrodes 168, and the width of the capacitor electrodes 168 is smaller than or equal to the width of the pixel electrode offshoots 166a, 166b. The lower substrate 152 further contains an insulation layer 176 covering the scan lines 158, the common electrodes 164, the common electrode offshoots 164a, 164b, 164c, and the capacitor electrodes 168. The upper substrate 154 and the lower substrate 152 comprise alignment films 170a, 170b on the inside surfaces thereof for aligning the arrangement direction of the liquid crystal molecules. The upper substrate 154 and the lower substrate 152 further comprise polarizers 172a, 172b on the outside surfaces thereof for guiding the scattering direction of light beams to increase the brightness of the IPS-LCD 150.

The capacitor electrodes 168, the pixel electrode offshoots 166a, 166b, and the insulation layer 176 between the capacitor electrodes 168 and the pixel electrode offshoots 166a, 166b are used together as storage capacitors of each pixel 162 for providing the electricity to switch on the pixel 162. The materials of the capacitor electrodes 168 and the common electrodes 164 are the same, which consist of titanium, aluminum, aluminum based alloy, ITO, or other conductive materials. It should be noticed that the common electrodes 164, the scan lines 158, and the capacitor electrodes 168 can be made by a single etching process, and the capacitor electrodes 168 do not electrically connect to the common electrodes 164, so that the capacitor electrodes 168 and the common electrodes 164 are positioned in a same plane on the lower substrate 152. Therefore the thickness of the lower substrate 152 will not increase and no extra process is needed. Since the storage capacitors of pixels 116 comprise the overlapping portions of the pixel electrode offshoots 166a, 166b and the capacitor electrodes 168, the pixel electrodes 166 does not have to cover the scan lines 158 anymore as storage capacitors so that the scan lines 158 can have a smaller width. However, the pixel electrodes 166 still can be designed to cover the scan lines 158 if the IPS-LCD 150 needs more storage capacitor area to supply more electricity.

Figure 8:
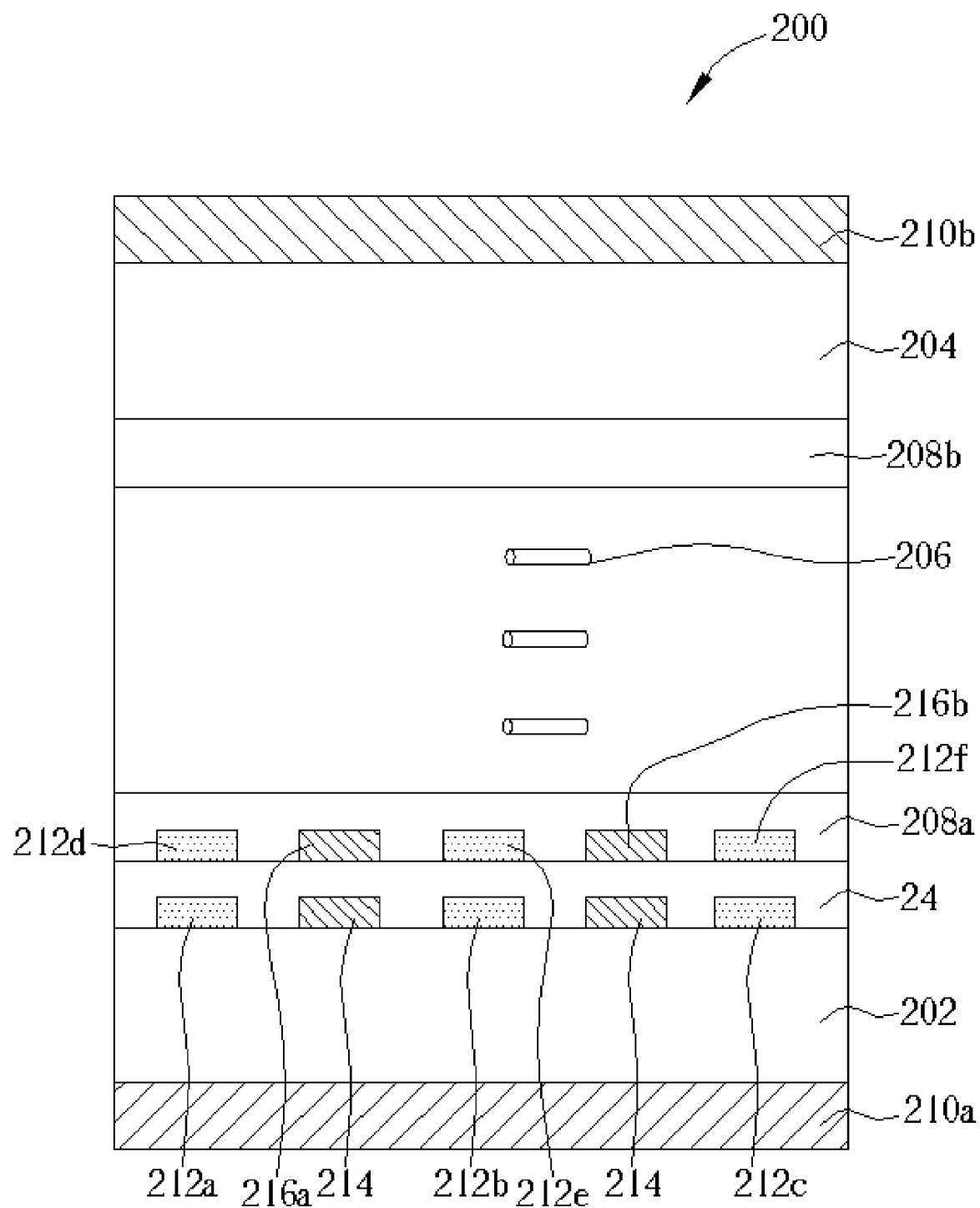
FIG. 8 is a section view of an IPS-LCD according to a third embodiment of the present invention.

FIG. 8 is a section view of an IPS-LCD 200 according to a third embodiment of the present invention. As shown in FIG. 8, the common electrode offshoots 212a, 212b, 212c, and the common electrode offshoots 212d, 212e, 212f are arranged in two different planes of the lower substrate 202. Under this design, horizontal electric fields are produced by the adjoining pixel electrode offshoots 216a, 216b and common electrode offshoots 212d, 212e, 212f, which effectively shorten the responding time of the liquid crystal molecules 206 than the first and second embodiment of the present invention. The overlapping portions of the pixel electrode offshoots 216a, 216b and the capacitor electrodes 214 are used as storage capacitors for providing the electricity switching on the pixels. In the IPS-LCD 200, the data lines (not shown), the pixel electrode offshoots 216a, 216b, and the common electrode offshoots 212a, 212b, 212c, 212d, 212e, 212f are all parallel with each other and shown as straight lines or bended lines. When fabricating the IPS-LCD 200, the common electrode offshoots 212a, 212b, 212c, and the capacitor electrodes 214 can be made with the same materials and by a single process. Similarly, the pixel electrode offshoots 216a, 216b and the common electrode offshoots 212d, 212e, 212f can be made together in a single deposition process and a single etching process. Accordingly, the goal of raising the opening ratio and improving the performance according to the third embodiment can be reached without extra processes. In another embodiment of the present invention, the capacitor electrodes 214 can be replaced by common electrode offshoots to achieve the same purpose. The application of the common electrode offshoots is a well-known technology by those skilled in the art, so that detailed description will not provided.

In contrast to the prior art, the IPS-LCD of the present invention uses the pixel electrodes, the common electrodes or the capacitor electrodes below the pixel electrodes, and the insulation layer between the two electrodes as storage capacitors of the pixels, so that the conventional structure using the pixel electrodes to cover the wider scan lines for being storage capacitors in prior art can be avoided. Furthermore, the present invention can be applied to either an IPS-LCD or a Super-IPS LCD without additional processes or increasing producing cost. Therefore the present invention can effectively reduce or exclude the overlapping portions of the pixel electrodes and the scan lines, furthermore reducing the width of the scan lines to raise the opening ratio and improve the image performance of an LCD.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An in-plane switching mode liquid crystal display (IPS-LCD) comprising:

a lower substrate;

a plurality of parallel scan lines and a plurality of data lines with equal distances positioned on the lower substrate, wherein the scan lines and the data lines are arranged in a crossing manner to form a pixel matrix, any two of the adjoining scan lines and any two of the adjoining data lines being crossed to define a pixel;

a plurality of first electrodes formed in each of the pixels, wherein each of the first electrodes contains a plurality of first electrode offshoots, the first electrode offshoots being arranged parallel with each other and at two different planes on the lower substrate, wherein at least one of the first electrode offshoots on the higher plane overlaps another first electrode offshoot on the lower plane, and the two overlapping first electrode offshoots have same shapes;

an insulation layer covering the scan lines and the first electrode offshoots at the lower plane;

a plurality of second electrodes formed in each of the pixels, wherein each of the second electrodes covers at least one of the first electrode offshoots in each of the pixels;

an upper substrate formed in parallel with and opposite to the lower substrate; and a plurality of liquid crystal molecules filled between the upper substrate and the lower substrate;

wherein an overlapping portion of each of the first electrode offshoots and each of the second electrode serves as a storage capacitor of each of the pixels.

2. The IPS-LCD of claim 1, wherein the first electrode offshoots are parallel with the data lines in each of the pixels.

3. The IPS-LCD of claim 1, wherein the second electrodes partially cover the scan lines, an overlapping portion of each of the second electrodes and each of the scan lines serving as the storage capacitor of each of the pixels.

4. The IPS-LCD of claim 1, wherein each of the second electrodes contains a plurality of second electrode offshoots, each of the second electrode offshoots being arranged parallel with the first electrode offshoots and covering one of the first electrode offshoots in each of the pixels.

5. The IPS-LCD of claim 1 further comprising a first polarizer and a second polarizer positioned on an upper surface of the upper substrate and a bottom surface of the lower substrate respectively.

6. The IPS-LCD of claim 1 further comprising a first alignment film and a second alignment film on a bottom surface of the upper substrate and an upper surface of the lower substrate respectively.

7. The IPS-LCD of claim 1, wherein each of the pixels further comprises a thin film transistor (TFT), the TFT serving as a switching device of the pixel.

8. The IPS-LCD of claim 1, wherein each of the first electrodes is used as a common electrode in each of the pixels.

9. The IPS-LCD of claim 1, wherein each of the second electrodes is used as a pixel electrode in each of the pixels.

10. The IPS-LCD of claim 1, wherein each of the first electrodes and each of the second electrodes are disposed in a single-layer structure or a multi-layer structure.

11. The IPS-LCD of claim 1, wherein the first electrodes and the second electrodes comprise titanium (Ti), aluminum (Al), aluminum based alloy, indium tin oxide (ITO), or other conductive materials.

12. The IPS-LCD of claim 1, wherein the data lines, the first electrode offshoots, and the second electrodes are bended lines.

13. An IPS-LCD comprising:

a lower substrate;

a plurality of parallel scan lines and a plurality of data lines with equal distances positioned on the upper surface of the lower substrate, wherein the scan lines and the data lines are arranged in a crossing manner to form a pixel matrix, any two of the adjoining scan lines and any two of the adjoining data lines being crossed to define a pixel;

a plurality of the first electrodes formed in each of the pixels, wherein each of the first electrodes contains a plurality of first electrode offshoots, the first electrode offshoots being arranged parallel with each other in the pixels and at two different planes on the lower substrate, wherein at least one of the first electrode offshoots at the higher plane covers another first electrode offshoot at the lower plane, and the two overlapping first electrode offshoots have same shapes;

a plurality of capacitor electrodes positioned at the lower plane where some of the first electrode offshoots are positioned, each of the pixels comprising at least one of the capacitor electrodes;

an insulation layer covering the first electrode offshoots at the lower plane, the capacitor electrodes, and the scan lines;

a plurality of second electrodes, each of the second electrodes covering at least one of the capacitor electrodes formed in each of the pixels;

an upper substrate positioned on the lower substrate in parallel with and opposite to the lower substrate; and a plurality of liquid crystal molecules filled between the lower substrate and the upper substrate;

wherein an overlapping portion of each of the second electrodes and each of the capacitor electrodes serves as a storage capacitor of each of the pixels.

14. The IPS-LCD of claim 13, wherein the first electrode offshoots are parallel with the data lines in the pixels.

15. The IPS-LCD of claim 13, wherein the second electrodes partially cover the scan lines, an overlapping portion of each of the second electrodes and the scan lines serving as the storage capacitor of each of the pixels.

16. The IPS-LCD of claim 13, wherein each of the second electrodes comprises a plurality of second electrode offshoots, each of the second electrode offshoots being arranged parallel with the first electrode offshoots and covering one of the capacitor electrodes formed in each of the pixels.

17. The IPS-LCD of claim 13 further comprising a first polarizer and a second polarizer positioned on an upper surface of the upper substrate and a bottom surface of the lower substrate respectively.

18. The IPS-LCD of claim 13 further comprising a first alignment film and a second alignment film on a bottom surface of the upper substrate and an upper surface of the lower substrate respectively.

19. The IPS-LCD of claim 13, wherein each of the pixels further comprises a TFT, the TFT serving as a switching device of the pixel.

20. The IPS-LCD of claim 13, wherein each of the first electrodes is used as a common electrode of each of the pixels.

21. The IPS-LCD of claim 13, wherein each of the second electrodes is used as a pixel electrode of each of the pixels.

22. The IPS-LCD of claim 13, wherein each of the first electrodes, each of the second electrodes, and each of the capacitor electrodes are disposed in a single-layer structure or a multi-layer structure.

23. The IPS-LCD of claim 13, wherein each of the first electrodes, each of the second electrodes, and each of the capacitor electrodes comprise titanium, aluminum, aluminum based alloy, ITO, or other conductive materials.

24. The IPS-LCD of claim 13, wherein the data lines, the first electrode offshoots, the second electrodes, and the capacitor electrodes are bended lines.

25. The IPS-LCD of claim 1, wherein the insulation layer vertically spaces apart the two overlapping first electrode offshoots.

26. The IPS-LCD of claim 1, wherein the first electrode offshoot at the higher plane, the second electrodes, and the data lines are positioned at the same plane.

27. The IPS-LCD of claim 1, wherein the first electrode offshoot at the lower plane and the scan lines are positioned at the same plane.

28. The IPS-LCD of claim 13, wherein the insulation layer vertically spaces apart the two overlapping first electrode offshoots.

29. The IPS-LCD of claim 13, wherein the first electrode offshoot at the higher plane, the second electrodes, and the data lines are positioned at the same plane.

30. The IPS-LCD of claim 13, wherein the first electrode offshoot at the lower plane and the scan lines are positioned at the same plane.

31. The IPS-LCD of claim 13, wherein each of the capacitor electrodes is one of the first electrode offshoots at the lower plane.

32. The IPS-LCD of claim 13, wherein each of the capacitor electrodes is electrically connected to one of the first electrodes.

33. The IPS-LCD of claim 13, wherein one of the capacitor electrodes in the $n^{th}$ pixel is electrically connected to the $n^{th}$ scan line or the $(n+1)^{th}$ scan line.

* * * * *